April 5, 1966   W. C. REXROAT   3,244,218
TIRE CHANGING TOOL
Filed June 28, 1962   2 Sheets-Sheet 1
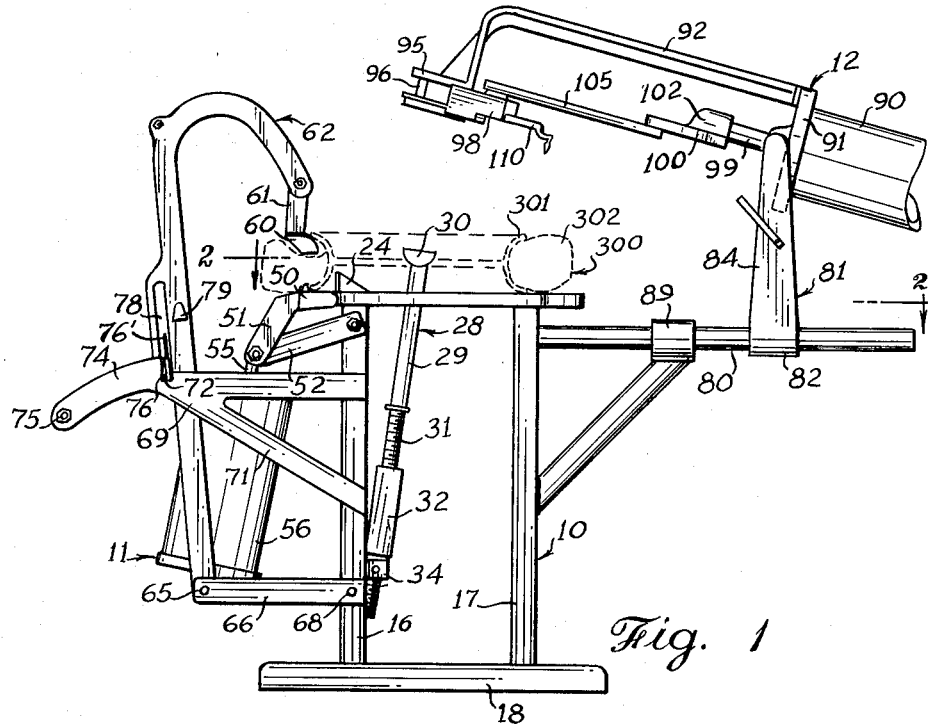
INVENTOR.
Wilbur C. Rexroat
BY
ATTORNEY April 5, 1966     W. C. REXROAT     3,244,218
TIRE CHANGING TOOL
Filed June 28, 1962                       2 Sheets-Sheet 2
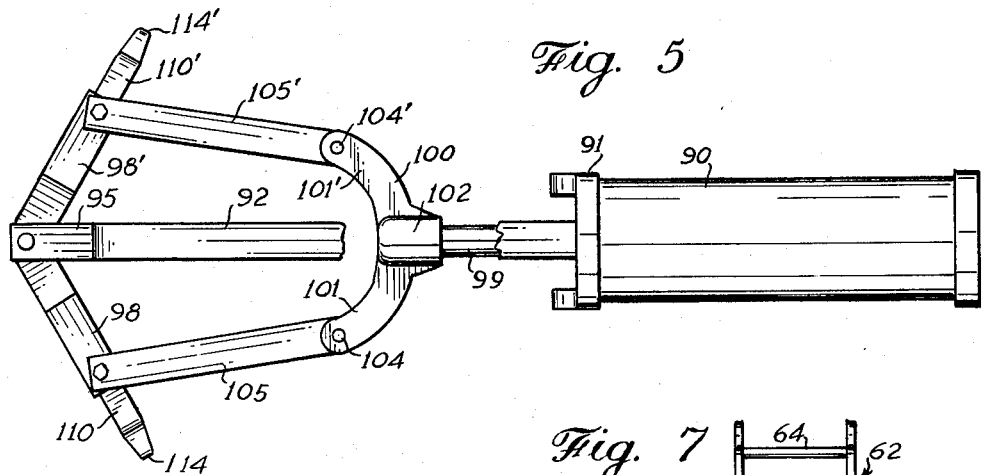
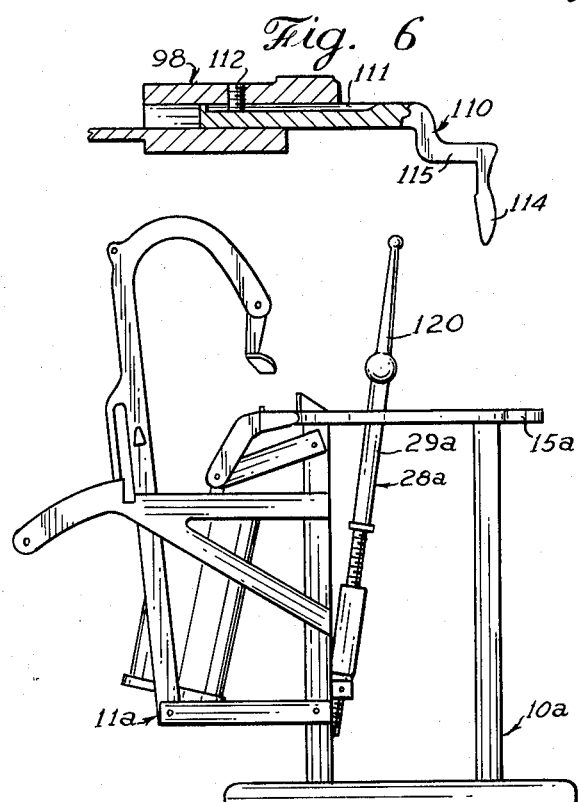
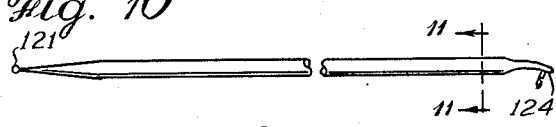
INVENTOR.
Wilbur C. Rexroat
BY
ATTORNEY

United States Patent Office 3,244,218
Patented Apr. 5, 1966

3,244,218
TIRE CHANGING TOOL
Wilbur C. Rexroat, Atlanta, Ga., assignor to Dynamic Center Engineering Co., Inc., Norcross, Ga., a corporation of Georgia
Filed June 28, 1962, Ser. No. 205,984
7 Claims. (Cl. 157—1.28)

This invention relates to a tire changing tool, and is more particularly concerned with an automatic tool for mounting a tire on, or demounting a tire from, a wheel.

In the past, various tools have been employed for putting a tire on a wheel, or removing a tire from a wheel. The job has been primarily a manual task with some hand tools to assist. The powered tools which have been devised in the past have done the job only partially, requiring manual assistance throughout the operation. The prior art machines which include bead breakers are so arranged that the bead breaker works efficiently on only one size wheel, though any such machine will be used for a great variety of sizes of wheels.

The device of the present invention overcomes the above objections by providing a completely powered apparatus for mounting a tire on, or demounting a tire from, a wheel. The machine must be started manually; but, the entire operation thereafter is automatic. The bead breaker on the present apparatus is so arranged that maximum efficiency is obtained on all sizes of wheels.

In general terms, the device of the present invention includes a wheel supporting table through which projects a hold-down center which is movable longitudinally of the table. Stationary stops on the table determine the position of the wheel with respect to the table and place one portion of the rim of a wheel in a given position regardless of wheel size. A bead breaker assembly is attached adjacent to the table, and will break both the top bead and the bottom bead at the point on the rim which is located by the stops. The bead breaker assembly includes a top bead breaker mounted on a carriage and carried by a link pivoted to the frame of the device; and, a bottom bead breaker mounted from the frame, adjacent the table. A fluid actuated cylinder operates both top and bottom bead breakers.

A mount and demount tool is disposed over the table, and includes a pair of fingers which are extensible and retractible. The fingers are rotated in opposite directions by a mechanical linkage operated by a fluid actuated cylinder.

It is therefore an object of the present invention to provide a tire mount and demount tool which has a completely powered operation.

It is another object of the present invention to provide a tire mount and demount tool which includes a bead breaker which will break both top and bottom beads with one operation.

Another object of the present invention is to provide a tire mount and demount tool which will place a bead on or remove a bead from a wheel without manual assistance.

A further object of the present invention is to provide a tire mount and demount tool which will allow the bead breaker to operate at maximum efficiency on all sizes of wheels.

And another object of the present invention is to provide a tire mount and demount tool which will operate with equal efficiency on either tubeless tires or tires with tubes.

A further object of the present invention is to provide a tire mount and demount tool which is durable in construction, efficient in operation, and well designed to meet the demands of economic manufacture and operation.

Other and further objects, features and advantages of the present invention will become apparent from consideration of the following specification taken in conjunction with the accompanying drawings in which:

FIG. 1 is a side elevational view of one preferred embodiment of the present invention.

FIG. 2 is a top plan view taken substantially along the line 2—2 in FIG. 1.

FIG. 3 is a detail view of the height adjustment mechanism for the hold-down center.

FIG. 4 is a detail, longitudinal cross sectional view of the clamp plate.

FIG. 5 is a top plan view partially broken away, of the mount and demount tool of the device shown in FIG. 1.

FIG. 6 is a detail of the mount and demount finger used in the mount and demount tool of FIG. 5.

FIG. 7 is an end elevational view of the device shown in FIG. 1, viewed from the left as shown in FIG. 1.

FIG. 8 shows a hand tool to be used with the device shown in FIGS. 1-7.

FIG. 9 is a side elevational view of a modified form of the invention.

FIG. 10 shows a hand tool to be used with the device shown in FIG. 9.

FIG. 11 is a cross-sectional view taken along the line 11—11 of FIG. 10.

Referring now more particularly to the drawings and to that embodiment here chosen by way of illustration, the device includes an upstanding frame generally denoted by 10, a bead breaker assembly 11 mounted on one side of frame 10, and a mount and demount tool secured to the opposite side of the frame 10, and generally designated by numeral 12.

The frame 10 includes a flat horizontal, wheel supporting table 15 supported by two pairs of legs, legs 16 on the left and legs 17 on the right, as seen in FIG. 1. The lower ends of the legs 16 and 17 are joined by horizontal runners 18.

The table 15 is disposed at about waist height and is oblong in shape, having inwardly curving sides 19 and rounded or arcuate ends 20 and 21. On the longitudinal center line of the table 15, and along the edge 20 is upstanding flange 22 which acts as a stop to locate a wheel 300 placed on the table 15. Inwardly of the edge 20, is a pair of radially disposed complementary stops 24 and 25 which are triangular upstanding pieces affixed on opposite sides of the centerline to the table 15, as by welding. It will thus be seen that when wheel 300 is placed on table 15, the stops 24 and 25 will protrude inside the rim 301 of wheel 300 to prevent the engaged portion of the rim from moving inwardly, while the flange 22 will abut the peripheral bottom edge of the rim 301 to prevent its movement outwardly.

Centrally of the table 15 is a rectangular slit 26 which slidably receives, therethrough, the square rod 29 of a hold-down and centering arm 28. The square rod 29 terminates above the table 15 in a tip 30 having a spherical bottom portion while its lower end is joined to an externally threaded shank or shaft 31. The shaft 31 permits the center arm 28 to be raised and lowered. The adjusting mechanism is more clearly shown in FIG. 3 of the drawings, and includes a rectangular housing 32 which is pivotally attached to legs 16 by ears 34. An opening in the housing 32 receives the shaft 31; and, inside the housing 32, immediately below the top member of the housing, a bevel gear 33 surrounds the shaft 31, and is internally threaded to cooperate with the external threads on shaft 31. A sleeve 35 surrounds shaft 31 below the gear 33 to prevent downward movement of gear 33. An axle 36 rotatably mounted in a side member of housing 32 carries a complementary bevel gear 38 which meshes with bevel gear 33. A crank 39 is attached to the axle 36 by which the axle and its associated gear 38 may be rotated, thus rotating the bevel gear 33 to raise or lower the shaft 31 through the cooperating threads.

A clamp plate, shown in detail in FIG. 4, is provided to be received by the upper end of the rod 29. The plate 40 is circular in plan view, and has a hemispherical recess 41 in the center thereof which receives the hemispherical tip 30 of square rod 29. A slit 42 allows the plate 40 to be slipped on the rod so that the tip 30 may be seated in the recess 41. The clamp plate, seen in side elevation, is of a frusto-conical shape, having the apex at the bottom.

It will thus be seen that a hold-down center or arm 28 is provided which may be raised sufficiently, by means of crank 39, to allow a wheel 300 to be placed therearound with its rim positioned by the stops 22, 24 and 25. The hold-down arm 28 is movable by virtue of the pivotal mounting of housing 32 so that the rod 29 can be centered within the wheel. The clamp plate 40 is placed around the rod 29 with the tip 30 in the recess 41, and the rod 29 is lowered to clamp the wheel 300 in place. The spherical joint formed by the tip 30 and recess 41 allows the plate 40 to be disposed horizontal even though the rod 29 be slanted. The frusto-conical bottom surface of the plate 40 provides accurate centering of the hold-down center for maximum, uniform clamping action.

*Bead breaker assembly*

The bead breaker assembly 11 is carried by the legs 16 of frame 10 and includes a bottom arcuate bead breaker 50 which is curved to match the curvature of end 20 of table 15, as seen in FIG. 2. The bottom bead breaker 50 is substantially rectangular in cross section, and is held adjacent and at an angle to the table 15 so that the edge toward the table 15 is higher than the edge away from the table 15. A pair of arms 51 extends downwardly from the bottom bead breaker 50, and is pivoted to one end of a pair of links 52, the other end of which is pivotally connected to the legs 16 of frame 10. Between the links 52, and on a common pivot point with bottom bead breaker arms 51, is a spacer bar 54 to the center of which is secured, as by welding, the piston rod 55 of bead breaker air cylinder 56.

Above the bottom bead breaker 50 is a top bead breaker 60 which is substantially complementary to the bottom bead breaker 50. The top bead breaker 60 is suspended by a pair of arms 61 which are pivotally secured to and depend from a carriage 62. The carriage 62 is constructed of a pair of struts held apart by spacers 64. The upper portion of the carriage 62 overhangs the bottom bead breaker, curves, from arms 61, upwardly and forwardly and then downwardly into a straight portion, the lower end of which is pivotally connected to the bottom of the bead breaker air cylinder 56 at pivot point 65. Also attached at pivot point 65 is one end of a link arm 66, the opposite end of which is pivoted to the lower end portion of legs 16 at pivot point 68.

Slightly above the center of legs 16, a pair of horizontal, parallel guide arms 69 extends forwardly, one arm on each side of the entire bead breaker assembly. The intermediate portions of arms 69 are supported by struts, such as strut 71, which extend upwardly and forwardly from the central portions of legs 16. The end portions 74 of arms 69 are curved downwardly, the arms 69 being provided, inwardly of the curved portions 74, with aligned notches 72. Spacer member 75 maintains proper spacing between the ends of the arms 69.

A flat rectangular latch bar 76, which is carried in aligned slots 78 in the straight intermediate portions of carriage 62, is adapted to cooperate with the notches 72 so that when the carriage 62 is moved rearwardly from an inoperative position resting against spacer member 75, to an operative position, the bar 76 drops into the upwardly open notches 72, thereby releasably locking the carriage 62 in essentially a vertical operative position. It will be understood, however, that the carriage 62 is free to move essentially vertically, since bar 76 is slidably carried in the slots 78. A handle 76' is provided for lifting the latch bar 76 out of notches 72 when it is desired to return the carriage to its inoperative position.

To limit the downward movement of carriage 62, a pair of diametrically opposed, sidewise extending bosses 79 are fixed to the sides of carriage 62 so as to overhang the arm 69.

It will now be seen that, with the carriage 62 in operative position as shown in the drawings, as the air cylinder 56 is retracted, the carriage 62, with the top bead breaker 60, is moved to their uppermost position; and, the bottom bead breaker is moved to its lowermost position. When the piston rod 55 of air cylinder 56 is extended, the links 66 will pivot downwardly, carrying the carriage 62 downwardly until the bosses 79 contact the stationary arms 69. In moving down, the carriage 62 lowers the top bead breaker 60, which will break the top bead on a tire placed on the table 15.

When the downward movement of carriage 62 is stopped, further projection of piston rod 55 will pivot the link 52 upwardly, and, hence, will push the bottom bead breaker 50 upwardly to break the bottom bead of a tire 302 carried by wheel 301 on table 15. Retraction of piston rod 55 will return the parts to the position shown in FIG. 1.

*Mount-demount tool*

The mount and demount tool 12 is supported on parallel rods 80, extending horizontally from the upper portion of the legs 17 of frame 10. A supporting bracket 81 has sleeves 82 for receiving the rods 80; and, upstanding arms 84, extending therefrom, for pivotally supporting the mount-demount tool. From the center web 85 of bracket 81, a strap 86 extends inwardly, the end of which is adjustably attached to a plate 88 carried by sleeves 89, the sleeves 89 being fixed on rods 80. A plurality of holes in the strap 86 allow various positionings of the bracket 81 with respect to the plate 88.

The mount and demount tool includes an air cylinder 90, the front end plate 91 of which is pivotally connected to the arms 84 of bracket 81. Also attached to the end plate 91 is a beam 92 which extends inwardly over the table 15. The end of the beam 92 turns down at a right angle to provide a frame to hold the operating mechanism hereinafter to be described. The inner end 94 of the frame is provided with spaced pivot plates 95 through which a pivot pin 96 passes to hold the mount-demount pivot fingers 98 and 98'.

Mounted on the piston rod 99 of the air cylinder 90 is a yoke 100. The yoke 100 is symmetric about the centerline of the cylinder, as seen in FIG. 5, and includes a pair of arcuate arms 101 and 101' extending from a central body 102. The outer extremities of the arms 101, 101' pivotally carry by pivot pins 104, 104', links 105 and 105'. The links 105 and 105' extend forwardly and connect respectively to the mount-demount pivot arm 98 and 98'.

It will thus be seen that, as the piston rod 99 is extended from the air cylinder 90, the yoke 100 will push the links 105, 105' to move arms 98 and 98' in an arcuate path to a position adjacent each other and extending away from the cylinder 90. As viewed in FIG. 5, when the rod 99 is projected, the arm 98' will be moved in a counterclockwise direction, and the arm 98 will be moved in a clockwise direction. Upon retraction of the piston rod 99, the movement will be the reverse, the arms 98, 98' each moving through essentially 180° until they extend toward cylinder 90.

As is more clearly seen in FIG. 6, the mount-demount fingers 110 and 110' are slidably received in their respective arms 98, 98'. A key slot 111 is formed in the upper surface of the finger 110, and a set screw 112 protruding through arm 98 is received in the key slot 111 to limit the travel of the finger 110. The finger 110 is sufficiently loose however, that it moves relatively easy. Finger 110' is secured to its arm 98' in like fashion.

The outer ends of fingers 110, 110' are bent downwardly then outwardly to provide intermediate portions such as portion 115 and then bent abruptly downwardly to provide bead engaging tip 114, 114' which are parallel to each other and are essentially vertically disposed when in use.

Operation

From the foregoing description, the operation of the device should now be obvious. If it be desired to remove a tire 302 from a wheel 300, the wheel 300 is placed on the table 15 over the end of rod 29 with the flange 22 abutting the outer periphery of the rim 301, and the stops 24 abutting the inner edge of the rim 301. The crank 39 is manipulated to raise the hold-down and centering arm 28 sufficiently for the clamp plate 40 to be placed therearound. The hold down and centering arm 28 is then lowered by crank 39 whereby clamp plate 40 clamps and holds the wheel 300 firmly in place.

Since the arm 28 is inclined upwardly and rearwardly, the retracting thereof tends to urge wheel 100 firmly against flange 22, regardless of its size. The carriage 62 is then moved to the position shown in the drawings, so that the latch 76 is received by the notches 72. Compressed air is then introduced into cylinder 56 to extend the piston rod 55. This causes the carriage 62 to be lowered, whereby the top bead breaker 60 engages the top wall of the tire 302 and slides inwardly to abut the rim 301 of wheel 300 upon further downward movement of bead breaker 60, continued projection of piston rod 55 will allow the bosses 79 on carriage 62 to seat on arms 69; and thus the bottom bead breaker 50 will begin to rise to break the bottom bead of the tire away from the rim 301 and urge it inwardly toward the center of rim 301. The air cylinder 56 is then reversed to retract piston rod 55; the latch bar 76 is then raised, manually, and the carriage 62 is pivoted forwardly to rest against the spacer member 75.

Tire 302 is urged inwardly whereby the bead of the tire is pushed toward the center of rim 301. Cylinder 90 is caused to extend piston rod 99. The hand tool 200, shown in FIG. 8, is now used to raise one portion of the top bead of the tire 102, the toe 201 of the tool 200 being inserted between the tire bead and the wheel rim 301 sufficiently to allow the entrance of the downwardly protruding tips 114, 114' of the mount-demount fingers 110, 110' as beam 92 is pivoted downwardly, manually. After the fingers are inserted between tire 302 and rim 301, the hand tool 200 is removed. Air is then introduced into the mount-demount cylinder 90 to retract the piston rod 99, which will move the arms 98, 98' and hence fingers 110, 110' in opposite arcuate directions around the rim 301 of the wheel 300. The pivot pin 96 will not necessarily be at the center of the wheel 300; however, the slidable mounting of the fingers 110, 110' will allow them to follow the rim 301. The bead of the tire 302 will roll up the outer curved surface of the finger tips 114, 114' and be stripped off the rim 301 of the wheel 300. When the fingers 110, 110' reach their rearmost position, the bead will be entirely off the rim 301 of the wheel 300. The mount-demount tool is then raised, and the arms 98, 98' returned to their extended position.

At this point, if the tire 302 has a tube (not shown) the tube must be removed by hand, which is a simple task since one bead of the tire 302 is completely off the rim 301.

Thereafter, the hand tool 200 is inserted under the bottom bead of the tire, and the entire procedure is repeated, thus removing the tire completely from the rim.

If it be desired to mount a tire 302 on a rim 301, the above procedure is somewhat reversed. The wheel 300 is placed on the table 15 as above described, and the tire 302 is laid over the rim 301. In the mounting operation, the mount-demount fingers 110, 110' must be in their retracted positions. The mount-demount tool is pivoted down so that the tips 114, 114' of the fingers 110, 110' are inserted between the tire bead and the wheel rim 301. Air is introduced into the cylinder 90 to extend the piston rod 99, causing the fingers 110, 110' to move rearwardly, and roll the tire bead on the wheel rim 301. When the fingers 110, 110' reach their forwardmost position, the bead will be on the wheel. If the tire 302 requires a tube (not shown) the tube should be inserted manually. After the bottom bead is on the wheel 300, next, the beam 92 is raised and the fingers 110, 110' are returned to their rearmost position, and the procedure repeated for the top bead. The tire 302 is then completely mounted on the wheel 300.

Second embodiment

The device shown in FIGS. 9 and 10 is substantially the same as that above described, with the omission of the powered mount-demount assembly. The bead breaker assembly 11a is exactly the same as the assembly 11 previously described. The frame 10a is identical except for the hold-down and centering arm 28a, the only difference being that portion of the hold-down and centering arm 28a which projects above the table 15a.

The device of FIG. 9 is designed for semi-powered operation and semi-manual operation. The bead breaker 11a is powered; but, the mounting or demounting is accomplished with the hand tool shown in FIG. 10. An extension 120 extends up from the rod 29a to act as a fulcrum when using the hand tool. The remainder of the arm 28a is identical to the arm 28.

In use, the bead is broken as described above, and the carriage moved outwardly. The rounded end 121 of the hand tool is then inserted between the tire bead and the wheel rim, the rod portion is placed against the extension 120, and the end of the hand tool is moved around to strip the bead from the rim.

To mount a tire 302a on a wheel 300a, the wheel 300a is placed on the table 15a as described above and the hooked end 124 is inserted between the tire bead and the wheel rim. The flat plate 125 is placed against the extension 120, and the hand tool pulled around to roll the bead into the rim 301a.

Thus, the device shown in FIGS. 9 and 10 accomplishes the same job as the previously described device, but requires manual effort to mount and demount the tire 302a. The device is, of course, less expensive and would be more suited for handling a smaller volume of tire changing.

The shape of tables 15 and 15a, each having a small central waist permits ready access to the valve stem whereby air may be released from a tire before it is removed from a wheel and whereby compressed air may be introduced into the tire when the tire has been installed on a wheel.

It will be understood by those skilled in the art that while the present invention is particularly suited to facilitate the changing of relative large truck and tractor tires, it is equally adaptable to the changing of small tires such as automobile tires.

The present invention, therefore, provides a tool which will mount a tire on a wheel, or demount a tire from a wheel with very little effort and very little time. The device is equally suited to both tube-type tires and tubeless tires. It will operate quite well on all standard sizes of wheels without adjustment, and always operates at maximum efficiency, regardless of wheel size.

It will of course be understood that the device here presented is only by way of illustration and is meant to be in no way restrictive; therefore, numerous changes and modifications may be made, and the full use of equivalents resorted to without departing from the spirit or scope of the invention as outlined in the appended claims.

I claim:

1. A device for demounting a tire from a wheel including a table for supporting said wheel, stop means at one edge of said table for locating a portion of the rim of said wheel at said edge of said table with said tire protruding therebeyond, hold-down means positionable in a plurality of positions laterally with the respect to said stop means for holding said wheel on said table in the position required by said stop means, and a bead breaker movable adjacent said one edge of said table for engaging the tire on said wheel and urging the bead of said tire away from the rim of said wheel.

2. A device for demounting a tire from a wheel including a table for supporting said wheel, opposed stops carried by said table for engaging the inner and outer peripheral portions of the rim of said wheel to prevent lateral movement of said wheel, said stops including a flange at one edge of said table to abut the outer periphery of said rim, and upstanding stop means to abut the inner periphery of said rim, movable hold-down means movable toward and away from said stops for holding said wheel on said table in the position required by said stops, and a bead breaker mounted adjacent said one edge of said table.

3. A device for mounting a tire on a wheel and demounting a tire from a wheel including a table for supporting said wheel, means for locating a portion of the rim of said wheel on said table, hold-down means for holding said wheel on said table, a bead breaker pivotally connected to said table and extending adjacent said portion of said rim, a support connected to said table and extending above said table at one side thereof, and mount-demount means pivotally supported by said support and extending over said table so as to be brought into operable position and moved out of operable position, said mount-demount means including a pair of fingers which in one position of said mount-demount means are closely adjacent each other and can be inserted into a single opening between the bead of the tire and the rim of said wheel and being movable around said rim in opposite directions and means for moving said fingers.

4. A device for mounting a tire on a wheel and demounting a tire from a wheel including a table for supporting said wheel, means for positioning said wheel along the centerline of said table, hold down means for holding said wheel on said table, a bead breaker mounted adjacent said table for engaging a portion of said rim, a support connected to said table and extending above said table at one side thereof, and mount-demount means supported by said support and extending over said table so as to be brought into operable position and moved out of operable position, said mount-demount means including a pair of arms pivotally supported over said table, a pair of fingers which in one position of said mount-demount means are closely adjacent each other and can be inserted into a single opening between the bead of the tire and the rim of said wheel and being slidably received in said arms, and means for moving said arms in opposite arcuate paths, said fingers being provided with tire engaging tips for engaging the bead of a tire to remove the same from a wheel.

5. A tire mounting and demounting tool comprising a frame, a horizontally disposed table carried by said frame for receiving a wheel thereon with a portion of a tire on said wheel protruding beyond one edge of said table, means for clamping said wheel to said table, a pair of opposed top and bottom tire breakers adapted to be disposed on opposite sides of said tire adjacent said one edge of said tire, a U-shaped carrier connected to said table and supporting at one end said top tire breaker, said carrier extending downwardly outwardly of said tire and terminating at its other end below said table, means supporting said carrier for pivotal movement about its other end and for movement upwardly and downwardly, latch means for latching said carrier in a position to dispose said top bead breaker over said tire, and power means interconnected between said carrier and said bottom bead breaker for simultaneously urging said bead breakers toward each other, a support connected to said table and extending over said table, a finger carried by said support and movable in an arcuate path around said table and engaging the beam of said tire and the rim of said wheel for removing said beam from said wheel, means for actuating said finger, a second finger carried by said support and movable in an arcuate path in a direction opposite the direction of movement of said first mentioned finger, said fingers being positionable adjacent each other over said one edge of said table for engaging the portion of the bead of said tire which has been broken by said top tire breaker, said means for actuating said finger also actuating said second finger for simultaneous movement of said first mentioned finger, said support including a beam, a beam supporting member mounted on said frame, one end of said beam being pivotally mounted along a common axis on said beam supporting member, the other end of said beam supporting said fingers, said means for actuating said finger including power means mounted in counterbalanced relationship to said beam on said beam supporting member, an actuating rod extending from said power means beneath said beam, a yoke on the end of said rod, and links pivotally carried by said yoke and pivotally engaging said fingers.

6. A tire mounting and demounting tool comprising a frame, a horizontally disposed table carried by said frame for receiving a wheel thereon with a portion of a tire on said wheel protruding beyond one edge of said table, means for clamping said wheel to said table, a pair of opposed top and bottom tire breakers adapted to be disposed on opposite sides of said tire adjacent said one edge of said tire, a U-shaped carrier connected to said table and supporting at one end said top tire breaker, said carrier extending downwardly outwardly of said tire and terminating at its other end below said table, means supporting said carrier for pivotal movement about its other end and for movement upwardly and downwardly, latch means for latching said carrier in a position to dispose said top bead breaker over said tire, and power means interconnected between said carrier and said bottom beam breaker for simultaneously urging said beam breakers toward each other, together with a support connected to said table and extending over said table, a finger carried by said support and movable in an arcuate path over said table and engaging the beam from said wheel, and means for actuating said finger.

7. A tire mounting and demounting tool comprising a frame, a horizontally disposed table carried by said frame for receiving a wheel thereon with a portion of a tire on said wheel protruding beyond one edge of said table, means for clamping said wheel to said table, a pair of opposed top and bottom tire breakers adapted to be disposed on opposite sides of said tire adjacent said one edge of said tire, a U-shaped carrier connected to said table and supporting at one end said top tire breaker, said carrier extending downwardly outwardly of said tire and terminating at its other end below said table, means supporting said carrier for pivotal movement about its other end and for movement upwardly and downwardly, latch means for latching said carrier in a position to dispose said top bead breaker over said tire, and power means interconnected between said carrier and said bottom beam breaker for simultaneously urging said beam breakers toward each other, together with a support connected to said table and extending over said table, a finger carried by said support and movable in an arcuate path over said table and engaging the beam of said tire and the rim of said wheel for removing said beam from said wheel, means for actuating said finger, and a second finger carried by said support and movable in an arcuate path in a direction opposite the direction of movement of said first mentioned finger, said fingers being positionable adjacent each other over said one edge of said table for engaging the portion of the bead of said tire which has been broken by said top tire breaker, said means for actuating said finger also actuating said second finger for simultaneously movement with said first mentioned finger.

References Cited by the Examiner
UNITED STATES PATENTS

| | | | |
|---|---|---|---|
| 2,698,652 | 1/1955 | Gardner | 157—1.28 |
| 2,825,395 | 3/1958 | Twiford | 157—1.28 |
| 2,900,017 | 8/1959 | Lewis | 157—1.22 |
| 2,903,050 | 9/1959 | Lewis | 157—1.22 |
| 3,008,512 | 11/1961 | Foster | 157—1.28 |
| 3,932,095 | 5/1962 | Brosene et al. | 157—1.28 |

FRANK E. BAILEY, *Primary Examiner.*